(12) United States Patent
Yamada (10) Patent No.: US 7,338,078 B2
(45) Date of Patent: Mar. 4, 2008

(54) EXTENSIBLE SHAFT FOR STEERING OF VEHICLE

(75) Inventor: Yasuhisa Yamada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 116 days.

(21) Appl. No.: 10/532,212

(22) PCT Filed: Oct. 17, 2003

(86) PCT No.: PCT/JP03/13299

§ 371 (c)(1),
(2), (4) Date: Apr. 22, 2005

(87) PCT Pub. No.: WO2004/037627

PCT Pub. Date: May 6, 2004

(65) Prior Publication Data

US 2006/0012161 A1    Jan. 19, 2006

(30) Foreign Application Priority Data

Oct. 24, 2002   (JP) .............................. 2002-309891

(51) Int. Cl.
*B62D 1/18*   (2006.01)
(52) U.S. Cl. .................. 280/775; 74/493; 464/167
(58) Field of Classification Search ................ 280/775; 464/140, 162, 167, 168; 74/493
See application file for complete search history.

(56) References Cited

U.S. PATENT DOCUMENTS 4,357,137 A * 11/1982 Brown ......................... 464/75
6,035,740 A * 3/2000 Budaker et al. ............... 74/493
6,343,993 B1 * 2/2002 Duval et al. ................. 464/167
6,557,433 B1 * 5/2003 Castellon ...................... 74/492

FOREIGN PATENT DOCUMENTS

| DE | 37 30 393 | 3/1989 |
|---|---|---|
| EP | 1 078 843 | 2/2001 |
| GB | 2 362 688 A | 11/2001 |
| JP | 4-123775 | 11/1992 |
| JP | 2000-38142 | 2/2000 |
| JP | 2001-50293 | 3/2001 |
| JP | 2001-239944 | 9/2001 |
| JP | 2002-286034 | 10/2002 |
| WO | WO 99/08920 | 2/1999 |

* cited by examiner

*Primary Examiner*—Paul N. Dickson
*Assistant Examiner*—Robert A. Coker
(74) *Attorney, Agent, or Firm*—Miles & Stockbridge PC (57) ABSTRACT

In a telescopic shaft for vehicle steering which is installed in a steering shaft of a vehicle and in which a male shaft (1) and a female shaft (2) are fitted to each other to be incapable of mutual rotation and capable of sliding, at least one set of torque transmitting members (7, 8) are interposed between at least one set of grooves (3, 4, 5, 6) formed on the outer peripheral surface of the male shaft and on the inner peripheral surface of the female shaft to be extended in the axial direction to face each other and at least one projection (40) formed to be axially concentric with at least one of the grooves (3, 4) extending in the axial direction on the outer peripheral surface of the male shaft is fitted in at least one of the grooves (5, 6) extended in the axial direction of the female shaft through a gap in the radial direction.

7 Claims, 9 Drawing Sheets

ELASTIC MEMBER

EXTENSIBLE SHAFT FOR STEERING OF VEHICLE

TECHNICAL FIELD

The present invention relates to a telescopic shaft for a steering of a vehicle capable of achieving a stable sliding load and, at the same time, of preventing a backlash without fail, thereby transmitting torque in a state of high rigidity.

BACKGROUND ART

Figure 9:
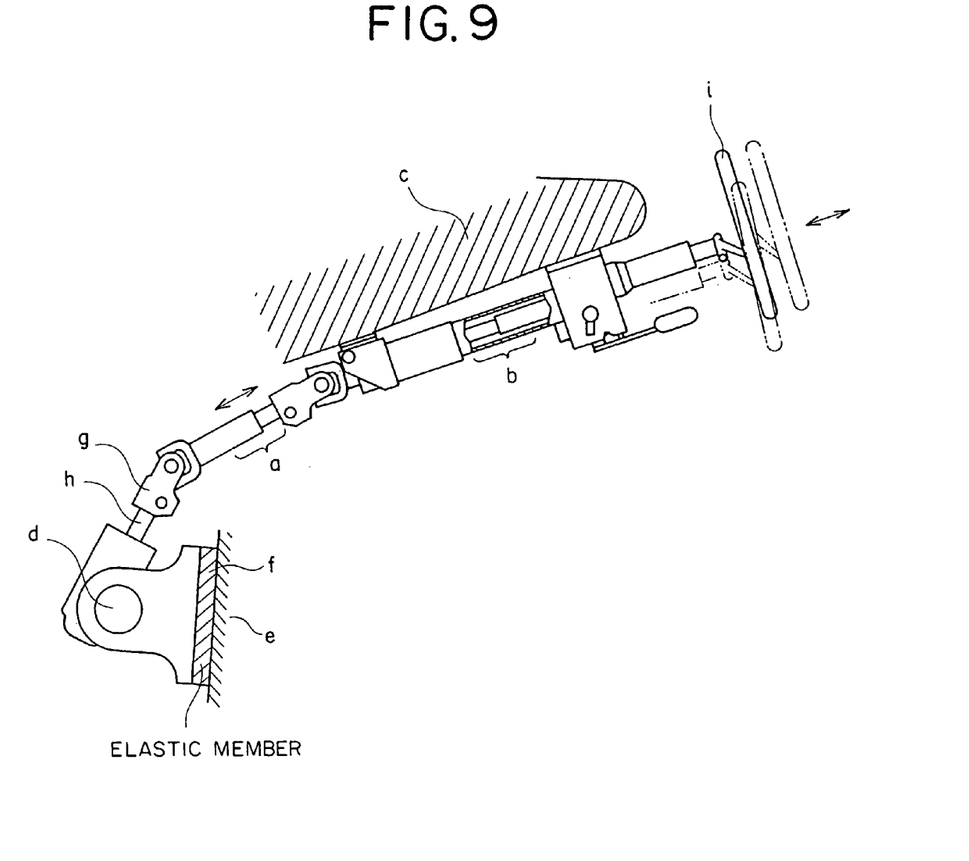
FIG. 9 is a side view of a conventional steering mechanism of a vehicle.

FIG. 9 shows a conventional steering mechanism of a vehicle. In FIG. 9, reference symbols a and b denote telescopic shafts. In the telescopic shaft a, a male shaft and a female shaft are in spline fitting. Such a telescopic shaft a is required to have a function of absorbing displacement in the axial direction which is generated during running of the vehicle and of preventing such displacement or vibration from being propagated onto a steering wheel. Such a function is usually required when the vehicle body is in a sub-frame structure in which a portion c for fixing an upper part of the steering mechanism and a frame e to which a steering rack d is fixed are separately provided and both members are fastened and fixed through an elastic member f such as rubber. There is also another case where a telescopic function is required for an operation, when fastening a steering shaft joint g to a pinion shaft h, to temporarily contract the telescopic shaft to then fit and fasten it to the pinion shaft h. Further, the telescopic shaft b in an upper part of the steering mechanism also comprises a male shaft and a female shaft being in spline fitting. This telescopic shaft b is required to have the ability of extending and contracting in the axial direction since it is required to have the function of moving the steering wheel i to adjust the position thereof in order to obtain an optimal position for the driver for driving the vehicle. In all the cases described above, the telescopic shaft is required to reduce backlash noise in a spline portion, to reduce the backlash feel on the steering wheel, and to reduce a sliding resistance during a sliding movement in the axial direction.

On that account, in FIGS. 1 through 6 of Japanese Patent Application Laid-Open No. 2001-50293 (FIGS. 1 through 6 and FIG. 12), three sets of spherical bodies or balls serving as torque transmitting members are fitted between the three sets of axial grooves formed on the outer peripheral surface of a male shaft and on the inner peripheral surface of a female shaft.

With this arrangement, backlash between the male shaft and the female shaft can be prevented when torque is not transmitted, and the male shaft and the female shaft can slide in the axial direction with a stable sliding load without backlash. On the other hand, the male shaft and the female shaft are capable of preventing backlash in the direction of rotation thereof so as to transmit torque in a state of high rigidity when the torque is transmitted.

In FIG. 12 of Japanese Patent Application Laid-Open No. 2001-50293 (FIGS. 1 through 6 and FIG. 12), while the three sets of spherical bodies or balls serving as the torque transmitting members are interposed between the three sets of axial grooves formed on the outer peripheral surface of the male shaft and on the inner peripheral surface of the female shaft, another three axial grooves are formed at regular intervals between the three axial grooves of the female shaft in the circumferential direction and furthermore, three projections are formed at regular intervals between the axial grooves of the male shaft in the circumferential direction. These three projections are fitted in the latter three axial grooves separately provided. However, there is allowed a predetermined gap, that is, play between the latter three axial grooves and the three projections in the radial direction.

With this arrangement, even when the spherical bodies or balls serving as the torque transmitting members are broken, the three projections are fitted in the latter axial grooves, whereby the male shaft and the female shaft can transmit torque and can discharge a fail safe function.

However, in Japanese Patent Application Laid-Open No. 2001-50293 (FIGS. 1 through 6 and FIG. 12), the three sets of the spherical bodies or balls serving as the torque transmitting members, the three axial grooves separately provided and the three projections are provided on the same cross section (the same surface in the circumferential direction), so that the radial dimensions of the male shaft and the female shaft become great and the sizes thereof can not be reduced.

Also, in Japanese Patent Application Laid-Open No. 2001-50293 (FIGS. 1 through 6 and FIG. 12), since the torque transmitting members consist only of the spherical bodies or balls, there is required the sufficient number of the spherical bodies or balls for enduring the surface pressure which is applied onto the spherical bodies or balls. As a result, the axial grooves are elongated and the axial dimensions of the male shaft and the female shaft become great, so that the telescopic shaft can not be formed compact.

DISCLOSURE OF THE INVENTION

The present invention has been contrived taking such circumstances as described above into consideration, and an object thereof is to provide a telescopic shaft for a steering of a vehicle which is capable of achieving a stable sliding load so as to prevent a backlash in a direction of rotation without fail, thereby transmitting torque in a state of high rigidity, and in which both the axial and radial dimensions thereof can be reduced to make the entire telescopic shaft compact.

In order to achieve the above object, according to the present invention, there is provided an telescopic shaft for a vehicle steering which is installed in a steering shaft of a vehicle and in which a male shaft and a female shaft are fitted to each other to be incapable of mutual rotation and capable of sliding, characterized in that:

at least one set of torque transmitting members are interposed between at least one set of grooves formed on the outer peripheral surface of said male shaft and on the inner peripheral surface of said female shaft to be extended in the axial direction to face each other; and at least one projection formed to be axially concentric with at least one of said grooves extending in the axial direction on the outer peripheral surface of said male shaft is fitted in at least one of said grooves extended in the axial direction of said female shaft through a gap in the radial direction.

According to the telescopic shaft for vehicle steering of the present invention, when the torque transmitting members slip off the male shaft or are broken for any reason, the projections of the male shaft are fitted in the grooves of the female shaft extended in the axial direction, whereby the male shaft and the female shaft can transmit the torque and can discharge the fail safe function.

In this case, since there is provided the gap in the radial direction between the grooves extended in the axial direction of the female shaft and the projections of the male shaft, the driver can feel a great backlash on the steering wheel and can sense any trouble of the steering system.

Further, the projections of the male shaft are formed to be axially concentric with the grooves extended in the axial direction of the male shaft and are also axially concentric with the torque transmitting members, so that they can play the role of a stopper for restricting a movement of the torque transmitting members in the axial direction. As a result, the possibility of slip-off of the torque transmitting members is reduced so as to further enhance the fail safe function.

Further, the projections of the male shaft are formed to be axially concentric with the axial grooves of the male shaft and are also axially concentric with the torque transmitting members, so that the radial dimensions of the male shaft and the female shaft can be reduced to make the entire telescopic shaft compact.

Also, in the telescopic shaft for vehicle steering according to the present invention, it is preferably possible to make the number of the sets of the torque transmitting members in the circumferential direction equal to the number of the projections in the circumferential direction. According to this preferable structure, the projections of the male shaft is axially concentric with the torque transmitting members, as described above and, moreover, can play the role of the stopper for restricting the movement of the torque transmitting members in the axial direction without fail since the number of the sets of the torque transmitting members in the circumferential direction is set equal to the number of the projections in the circumferential direction, whereby the possibility of slip-off of the torque transmitting members can be further reduced.

Further, in the telescopic shaft for vehicle steering according to the present invention, it is preferable that one end of the female shaft can comprise an inward deformation portion which is inwardly deformed. According to this preferable structure, when the male shaft is relatively moved in a direction of removing from the female shaft, the projections of the male portion latch on to (interfere with) the inward deformation portion (e.g., a clamp portion) formed at the end of the female shaft. With this arrangement, the male shaft can not be separated from the female shaft easily.

Further, in the telescopic shaft for vehicle steering according to the present invention, the torque transmitting members can preferably comprise at least one set of spherical bodies and at least one set of columnar bodies. According to this preferable structure, the torque transmitting members comprise at least one set of spherical bodies and at least one set of columnar bodies, and have a slide mechanism for causing both a rolling movement by means of the spherical bodies and a sliding movement by means of the columnar bodies, so that the columnar bodies mainly receive a load when the torque is transmitted. As a result, it is possible to reduce the size of the present structure, compared with the conventional one which is required to transmit torque by point contact (the structure of transmitting torque only with balls), by reducing the size thereof in the axial direction.

EMBODIMENTS OF THE INVENTION

A telescopic shaft for a vehicle according to an embodiment of the present invention will be described below with reference to drawings.

Figure 1:
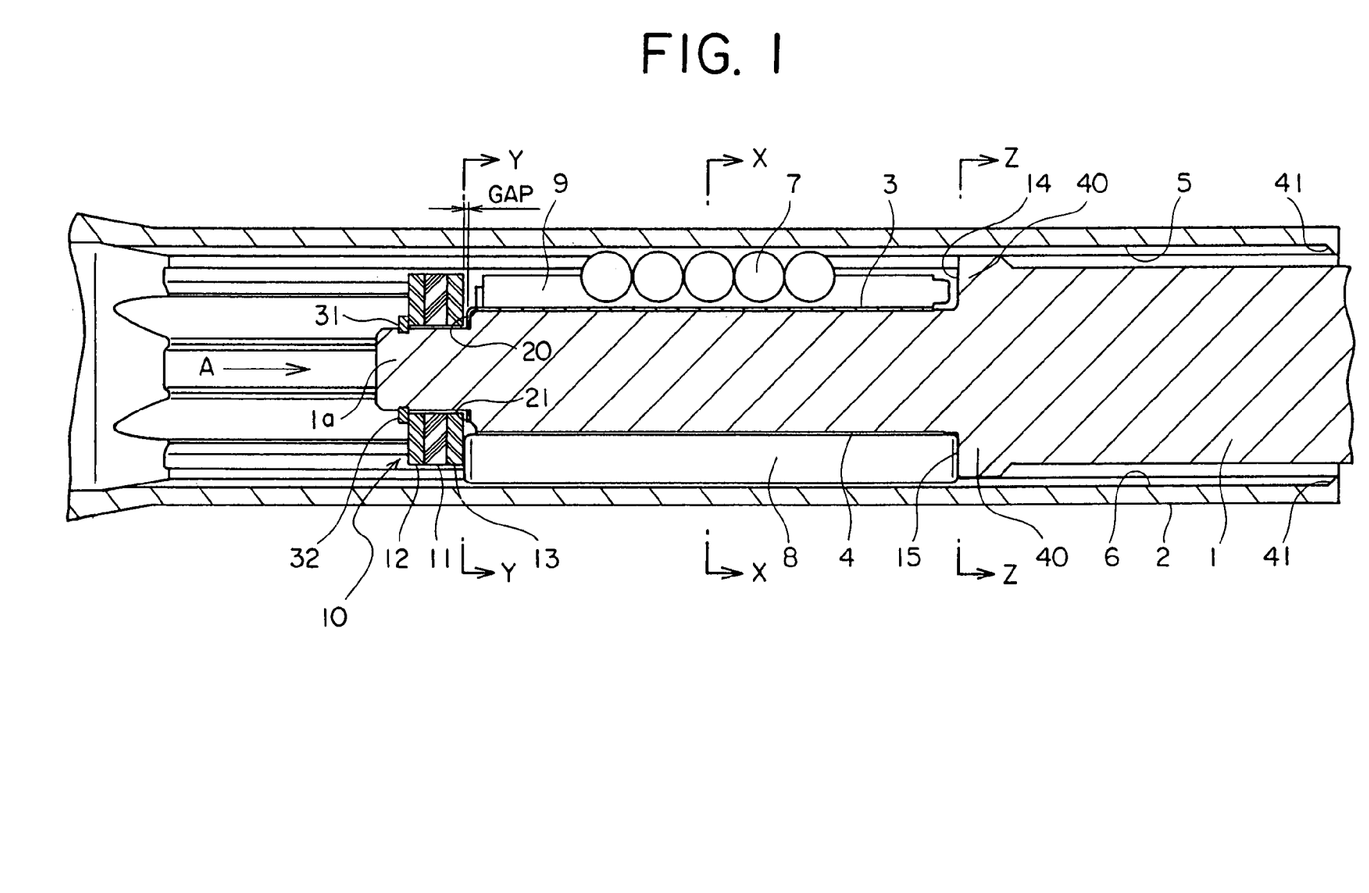
FIG. 1 is a vertical cross sectional view of a telescopic shaft for a steering of a vehicle according to one embodiment of the present invention.
Figure 2:
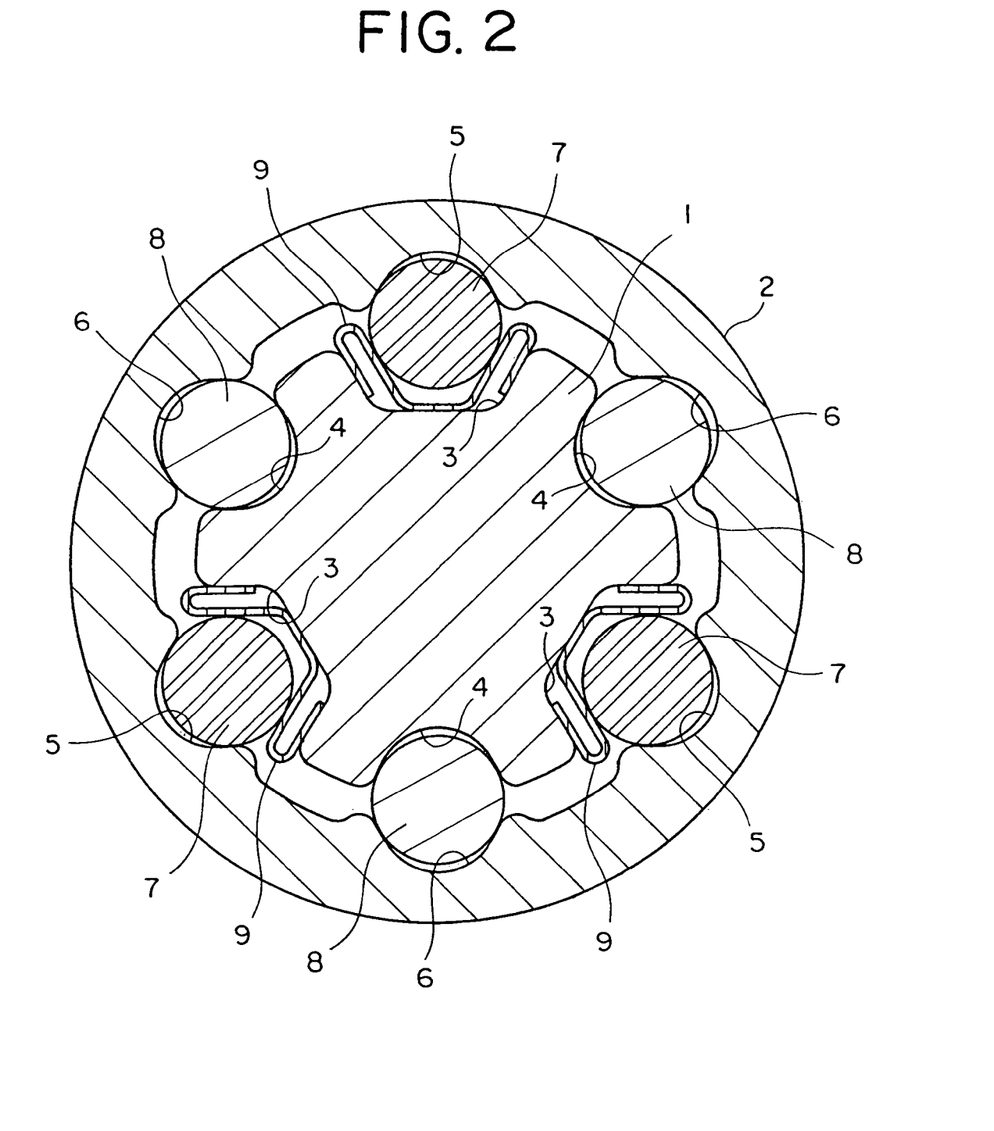
FIG. 2 is a transverse cross sectional view of the telescopic shaft, taken along the line X-X in FIG. 1.

FIG. 1 is a longitudinal cross sectional view of a telescopic shaft for a steering of a vehicle according to one embodiment of the present invention, and FIG. 2 is a transverse cross sectional view of the telescopic shaft, taken along the line X-X in FIG. 1.

As shown in FIG. 1, the telescopic shaft for a vehicle steering (hereinafter called the "telescopic shaft") comprises a male shaft 1 and a female shaft 2 which are fitted to each other to be incapable of mutual rotation and capable of sliding.

As shown in FIG. 2, three grooves 3 are provided on the outer peripheral surface of the male shaft 1 at regular intervals of 120° in the circumferential direction to be extended in the axial direction. On the outer peripheral surface of the male shaft 1, there are also provided at regular intervals of 120° in the circumferential direction three substantially arch-shaped grooves 4 which respectively are circumferentially between the three grooves 3 extended in the axial direction.

On the inner peripheral surface of the female shaft 2, there are provided at regular intervals of 120° in the circumferential direction three substantially arch-shaped grooves 5 which are extended in the axial direction. On the inner peripheral surface of the female shaft 2, there are also provided three substantially arch-shaped grooves 6 which are respectively circumferentially between the three grooves 5 extended in the axial direction at regular intervals of 120° in the circumferential direction.

The grooves 3 and 5 extended in the axial direction constitute three sets of first interposing sections for three sets of spherical bodies 7 which will be described later, while the grooves 4 and 6 extended in the axial direction constitute three sets of second interposing sections for three sets of columnar bodies 8 which will be described later. The three sets of the grooves 3 and 5 extended in the axial direction (the first interposing sections) and the three sets of the grooves 4 and 6 (the second interposing sections) are provided alternately in the circumferential direction at regular intervals of 60° in the circumferential direction.

A first torque transmitting device is arranged such that, between the three grooves 3 of the male shaft 1 extended in the axial direction and the three grooves 5 of the female shaft 2 extended in the axial direction, the three sets of the spherical bodies 7 serving as first torque transmitting members which are rotated when the male shaft 1 and the female shaft 2 are moved in the axial direction relatively to each other and are restrained by the leaf springs 9 when both shafts are rotated so as to transmit torque are interposed to be rotatable through three waveform elastic members (the leaf springs) 9 for applying preload.

A second torque transmitting device is arranged such that, between the three grooves 4 of the male shaft 1 extended in the axial direction and the three grooves 6 of the female shaft 2 extended in the axial direction, the three sets of the columnar bodies 8 serving as second torque transmitting members which respectively allow an axial relative movement of the male shaft 1 and the female shaft 2 so as to transmit torque during rotation are interposed to be slidable.

The leaf springs 9, while applying a preload to the spherical bodies 7 and the columnar bodies 8 to the extent that no backlash is generated with respect to the female shaft 2 when the torque is not transmitted, are elastically deformed to retain the spherical bodies 7 between the male shaft 1 and the female shaft 2 in the circumferential direction when the torque is transmitted.

With the telescopic shaft having a structure as described above, since the spherical bodies 7 and the columnar bodies 8 are interposed between the male shaft 1 and the female shaft 2 to preload the spherical bodies 7 and the columnar bodies 8 to the extent that no backlash is generated with respect to the female shaft 2 by means of the leaf spring 9, backlash between the male shaft 1 and the female shaft 2 can be prevented without fail when the torque is not transmitted and the male shaft 1 and the female shaft 2 can slide in the axial direction with a stable sliding load with no backlash when the male shaft 1 and the female shaft 2 are moved in the axial direction relatively to each other.

Note that, if a sliding surface employs only a pure sliding mechanism, as in the prior art, a preload for preventing backlash is obliged to be retained only a certain load. That is, since the sliding load is obtained by multiplying a coefficient of friction by a preload, if the preload is increased in order to prevent backlash or enhancing the rigidity of the telescopic shaft, the sliding load is increased, thus forming a vicious circle.

In this respect, since the present embodiment partially employs a rolling mechanism, a preload can be raised without conspicuously increasing a sliding load. With this arrangement, prevention of backlash and enhancement of the rigidity, which can not be achieved according to the prior art, can be achieved without increasing the sliding load.

At torque transmission, the three sets of the lead springs 9 are elastically deformed to retain the three sets of the spherical bodies 7 between the male shaft 1 and the female shaft 2 and, at the same time, the three sets of the columnar bodies 8 interposed between the male shaft 1 and the female shaft 2 play the role of main transmitters of the torque.

For instance, when torque is inputted from the male shaft 1, since a pressure of the leaf springs 9 is applied at the early stage, there is generated no backlash and the leaf springs 9 produce a counter force against the torque to transmit the torque. In this case, the torque transmission is executed as a whole in a state that a torque transmitting load among the male shaft 1, the leaf springs 9, the spherical bodies 7 and the female shaft 2 and a torque transmitting load among the male shaft 1, the columnar bodies 8 and the female shaft 2 are in balance.

When the torque is further increased, since a gap between the male shaft 1 and the female shaft 2 in the direction of rotation through the columnar bodies 8 is set as smaller than that among the male shaft 1, the leaf springs 9, the spherical bodies 7 and the female shaft 2 through the spherical bodies, the columnar bodies 8 receive the counter force more strongly than the spherical bodies 7. As a result, the columnar bodies 8 mainly transmit the torque to the female shaft 2. For this reason, the backlash between the male shaft 1 and the female shaft 2 in the direction of rotation can be prevented without fail and, at the same time, the torque can be transmitted in a state of high rigidity.

Note that the spherical bodies 7 may be balls, and the columnar bodies 8 may be needle rollers.

The needle rollers 8 are advantageous in various aspects since they receive the load with line contact and can keep the contact pressure lower than the balls 7 which receive the load with point contact. As a result, this arrangement is superior in the following points to a case in which all of the arrays are in ball rolling structure.

The attenuating performance in the sliding portion is great, compared with that in the ball rolling structure. As a result, the vibration absorbing performance is high.

If the same torque is to be transmitted, the contact pressure can be kept low in the needle roller structure. As a result, the length in the axial direction can be reduced so as to use the space effectively.

If the same torque is to be transmitted, the contact pressure can be kept low in the needle roller structure. As a result, there is no longer required an additional process for hardening the surfaces of the axial grooves of the female shaft by thermal treatment or the like.

The number of constituent parts can be reduced.

The assembling performance can be improved.

The assembling cost can be reduced.

As described above, the needle rollers 8 play the essential role for torque transmission between the male shaft 1 and the female shaft 2, and are brought into sliding contact with the inner peripheral surface of the female shaft 2. This structure is superior to the conventional spline fitting structure in the following respects.

The needle rollers are manufactured in mass production, and can be manufactured at very low cost.

The needle rollers are polished after the thermal treatment, so that they have high surface rigidity and excellent abrasion fastness.

Since the needle rollers have been polished, they have fine surface roughness and a low coefficient of friction in a sliding movement. As a result, the sliding load can be kept low.

Since the length or the layout of the needle rollers can be changed in accordance with the condition of use, the needle rollers can answer various applications without changing the design concept.

There is a case in which the coefficient of friction at sliding is required to be further lowered, depending on the condition of use. In such a case, the sliding characteristic can be changed only by subjecting the needle rollers to the surface treatment. As a result, the needle rollers can answer various applications without changing the design concept.

Since needle rollers having different outer diameters by several microns can be manufactured at low cost, the gap among the male shaft, the needle rollers, and the female shaft can be minimized by selecting a diameter of the needle rollers. As a result, the rigidity of the shaft in the twist direction can be improved easily.

On the other hand, the present structure is superior since partially employing the balls, to a structure in which all arrays are constituted by needle rollers and all arrays are sliding, in the following respects.

Since a frictional resistance is low, the sliding load can be kept low.

The preload can be raised, so that prevention of backlash and high rigidity over a long period of time can be attained at the same time.

Figure 3:
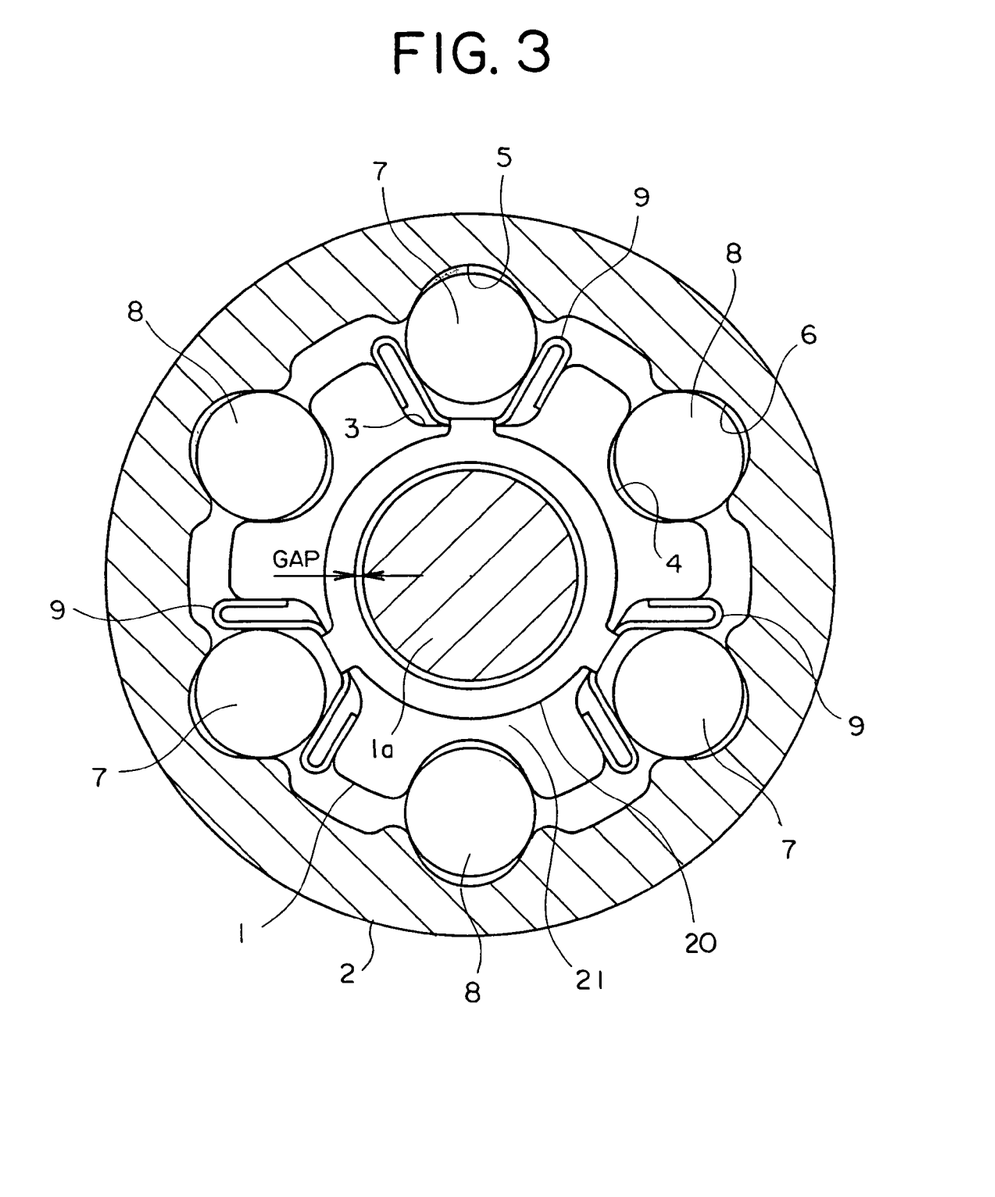
FIG. 3 is a transverse cross sectional view of the telescopic shaft, taken along the line Y-Y in FIG. 1.
Figure 4:
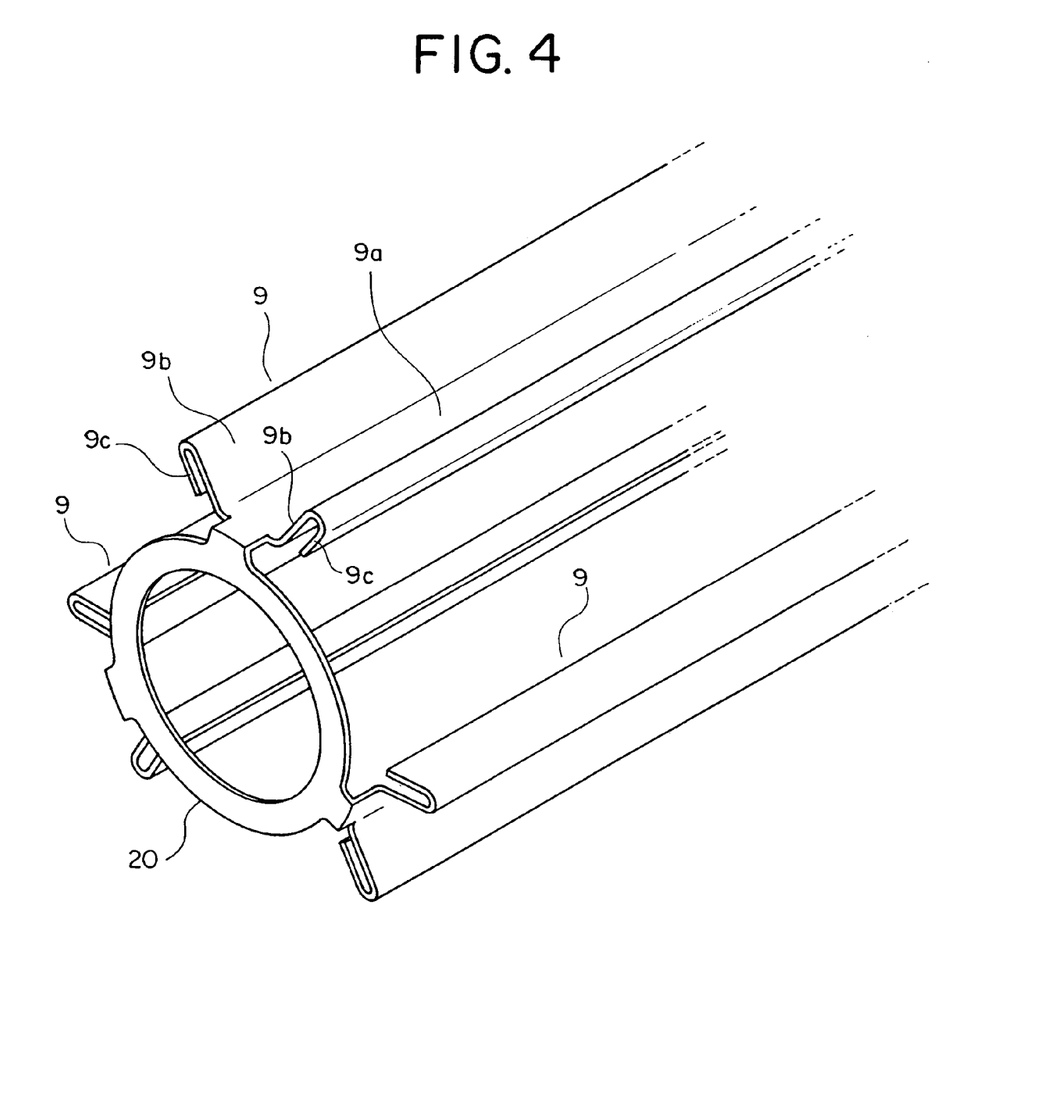
FIG. 4 is a perspective view of an elastic member (leaf spring) coupled by a coupling portion.
Figure 5:
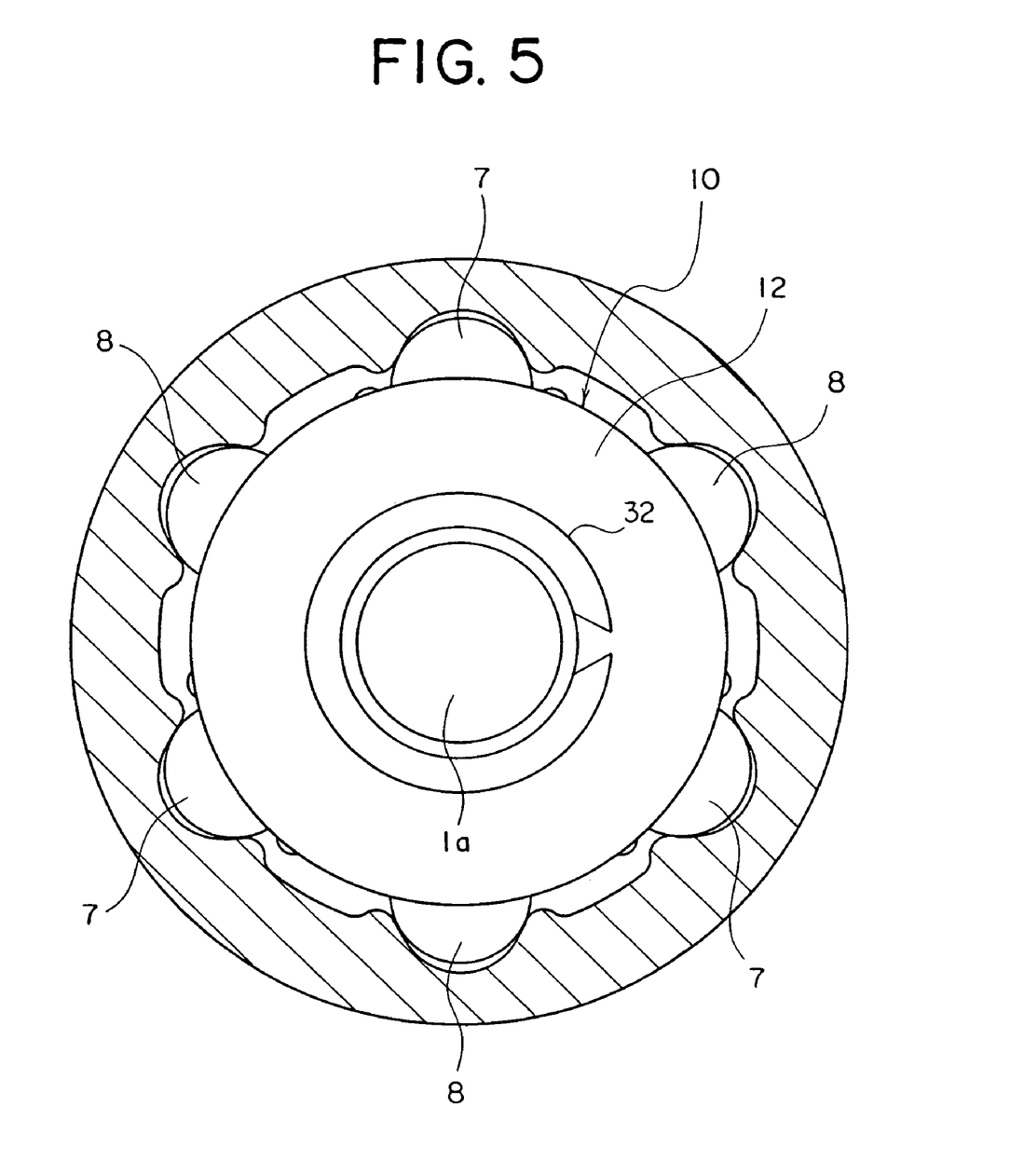
FIG. 5 is a view of the telescopic shaft, seen along the arrow A in FIG. 1.

FIG. 3 is a transverse cross sectional view taken along the line Y-Y in FIG. 1, FIG. 4 is a perspective view of the leaf spring which serves as an elastic member coupled by a coupling portion, and FIG. 5 is a view seen along the arrow A in FIG. 1.

As shown in FIG. 1, a small diameter portion 1a is formed at one end of the male shaft 1. This small diameter portion 1a is provided with a stopper plate 10 for restricting an axial movement of the needle roller 8. This stopper plate 10 is comprised of an elastic member 11 for applying preload in the axial direction and one set of flat plates 12, 13 for sandwiching this elastic member 11 therebetween.

That is, in the present embodiment, the stopper plate 10 is fitted in the small diameter portion 1a at the flat plate 13, the elastic member 11 for axial preload and the flat plate 12 in this order, and is fixed to the small diameter portion 1a firmly.

In the present embodiment, a circumferential groove 31 is formed in the small diameter portion 1a of the male shaft 1, and a stop ring 32 is fitted in this circumferential groove 31. With this arrangement, the stopper plate 10 is fixed in the axial direction. Note that means for fixing the stopper plate 10 is not limited to the stop ring 32, but may be caulking (or clinching), threadably engaging means, push nut, or the like.

With this structure, the stopper plate 10 brings the flat plate 13 into pressure contact with the needle rollers 8, so as to apply appropriate preload to the needle rollers 8 in such a manner that they are not moved in the axial direction by means of the elastic member 11 for axial preload.

The elastic member 11 for axial preload is formed of rubber, resin, or a leaf spring made of a steel plate. The elastic member 11 for axial preload and the flat plates 12 and 13 may be formed separately, but are preferably formed as a unitary structure, in order to attain easier assembling.

For instance, when the elastic member 11 is formed of rubber, if the flat plates 12 and 13 are formed by vulcanizing process, or the like, both members can be integrally formed to resultantly provide a product which can be assembled easily and manufactured at low cost.

Also, when the elastic member 11 is formed of resin, the elastic member 11 may be formed in a wave shape and can be formed integrally with the flat plates 12 and 13 as a unitary structure. As a result, the same merits can be obtained.

Furthermore, the flat plates 12 and 13 may be formed of a steel plate or resin, or by coating resin film on a steel plate.

The axial grooves 3 and 4 of the male shaft 1 are formed substantially perpendicularly to the axial direction, and have surfaces 14 and 15 which are right-angled to the axial direction and in contact with the balls 7 or the needle rollers 8.

As described above, one end of the needle roller 8 is prevented from moving in the axial direction by the stopper plate 10 which is provided in the small diameter portion 1a of the male shaft 1. On the other hand, the other end of the needle roller 8 is brought into contact with the axially right-angled surface 15 to be prevented from moving in the axial direction.

The stopper plate 10 brings the flat plate 13 into contact with the needle rollers 8, and appropriately preload the needle rollers 8 in such a manner that they are not moved in the axial direction by means of the elastic member 11 for axial preload.

As a result, the needle rollers 8 can be properly preloaded and fixed without gap in the axial direction, and when the male shaft 1 and the female shaft 2 slide relatively to each other, unpleasant abnormal sound such as rapping sound can be prevented without fail.

The grooves 3 and 4 extended in the axial direction of the male shaft 1, have the axially right-angled surfaces 14 and 15 which are substantially perpendicular to the axial direction, and are in contact with the balls 7 and the needle rollers 8, so that the axial movement of the balls 7 or the needle rollers 8 can be restricted by the axially right-angled surface 15 and no other member is required to be provided separately for this purpose. As a result, the number of the constituent parts can be decreased to reduce the manufacturing cost and, moreover, the weight and the size of the whole shaft can be reduced since such a separate member is not employed.

Next, in the present embodiment, as shown in FIGS. 1, 3 and 4, the three leaf springs 9 for preloading the three sets of the balls 7 are integrally coupled by a ring-shaped coupling portion 20.

That is, as shown in FIG. 1, the small diameter portion 1a at one end of the male shaft 1 is formed with an annular surface 21 as a step thereof. The ring-shaped coupling portion 20 is fitted in the small diameter portion 1a, and the ring-shaped coupling portion 20 is provided along the annular surface 21 of the step.

The annular surface 21 of the step may take any form, etc., so long as it is an axially annular surface facing the axial direction of the male shaft 1.

The ring-shaped coupling portion 20 is coupled to end portions of the three leaf springs 9 in the axial direction at three positions on the periphery thereof. That is, as shown in FIG. 4, the ring-shaped coupling portion 20 is formed integrally with the three leaf springs 9 extended in the axial direction as a unitary structure.

As a result, though in this structure the balls 7 and the needle rollers 8 are combined with each other, the actual number of the constituent parts can be reduced from three to one by integrally forming three leaf springs 9 which respectively forms rolling surfaces, whereby the number of the constituent parts can be reduced, the assembling performance can be enhanced and the assembling time can be shortened, thereby reducing the manufacturing cost. It is possible to omit the coupling portion 20 and form the three leaf springs 9 as respective separate members.

Since the ring-shaped coupling portion 20 is not like a conventional arch-shaped coupling portion which is extended in the circumferential direction, the female shaft 2 is not enlarged in the radial direction so that the size of the shaft can be reduced.

Further, the small diameter portion 1a which is formed at the end of the male shaft 1 is thrust through the ring-shaped coupling portion 20. Accordingly, when the three leaf springs 9 are assembled, the small diameter portion 1a at the end of the male shaft 1 plays the role of a guide in this assembling by thrusting through the ring-shaped coupling portion 20, whereby the assembling work can be performed easily and the assembling time can be reduced, thereby reducing the manufacturing cost.

Further, the ring-shaped coupling portion 20 is disposed in an axial gap 1 between the flat plate 13 of the stopper plate 10 and the annular surface 21 of the step. This axial gap 1 has a size of, for example, about 0.3 mm to 2.0 mm.

Due to the presence of this axial gap 1, the ring-shaped coupling portion 20 does not restrain the movement of the three leaf springs 9 when these leaf springs 9 are deformed upon input of the torque.

Further, as shown in FIGS. 3 and 4, each leaf spring 9 has a cross section which is formed as a straight line which is formed substantially in parallel to the form of the axial groove 3 of the male shaft 1, and is comprised of a flat bottom portion 9a at the center thereof, first inclined side surfaces 9b, 9b which are extended as gradually widened outward from both ends in a direction perpendicular to the axial direction with respect to this flat bottom portion 9a, and second inclined side surfaces 9c, 9c which are folded back outward on the outermost diameter sides of these first inclined side surfaces to be extended substantially in parallel to the first inclined side surfaces 9b, 9b. The peripheral part of the ring-shaped coupling portion 20 is coupled to the flat bottom portion 9a at the center of each leaf spring 9. The flat bottom portion 9a of each leaf spring 9 is brought into pressure contact with a flat bottom portion 3a of the groove 3 while the second side surfaces 9c, 9c are brought into pressure contact with flat side surfaces 3b, 3b of the groove 3, whereby the balls 7 and the needle roller 8 are pressed against a side surface of the groove 5 of the female shaft 2 by means of the first side surfaces 9a, 9a.

Further, the small diameter portion 1a formed at the end of the male shaft 1 is inserted through the ring-shaped coupling portion 20. A radial gap is formed between the small diameter portion 1a of the male shaft 1 and the ring-shaped coupling portion 20. This radial gap has a size of, for example, 0.2 mm to 1.0 mm. Like the axial gap described above, due to the presence of this radial gap, it is arranged such that the ring-shaped coupling portion 20 does not restrain the movement of these leaf springs 9 even when the three leaf springs 9 are deformed upon input of the torque.

Figure 6:
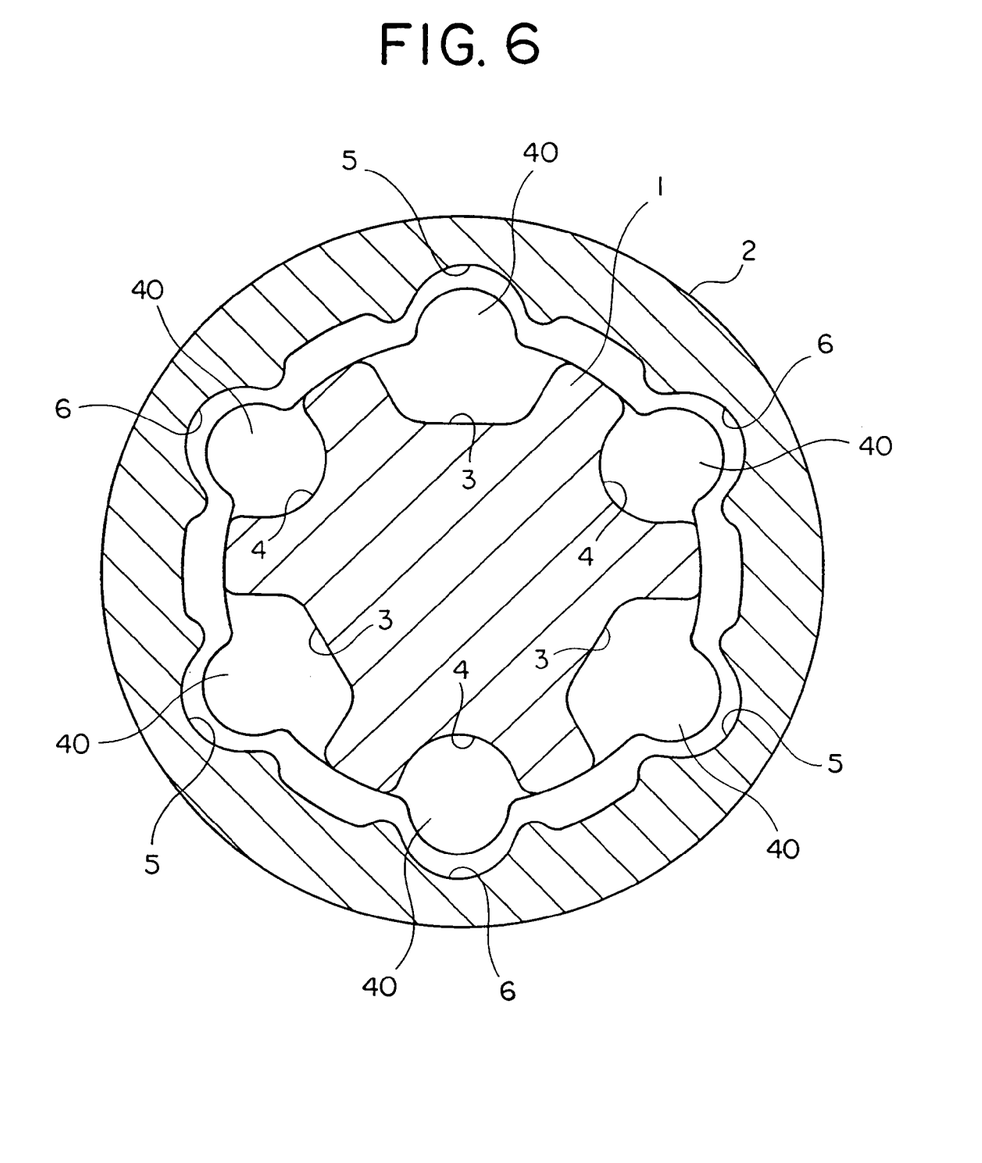
FIG. 6 is a cross sectional view of the telescopic shaft, taken along the line Z-Z in FIG. 1.

Next, as shown in FIGS. 1 and 6, in the present embodiment, six substantially arch-shaped projections 40 which are formed axially concentrically with the six grooves 3 and 4 which are extended in the axial direction on the outer peripheral surface of the male shaft 1 are opposite to the six grooves 5 and 6 of the female shaft 2 extended in the axial direction through a gap in the radial direction.

As a result, when the ball 7 or the needle roller 8 slips off the male shaft 1 or is broken for any reason, the projections 40 of the male shaft 1 are fitted in the grooves 5 and 6 of the female shaft 2 extended in the axial direction, whereby the male shaft 1 and the female shaft 2 can transmit torque and can discharge the fail safe function.

As shown in FIG. 6, since there is formed a gap between the grooves 5 and 6 extended in the axial direction of the female shaft 2 and the projections 40 of the male shaft 1, the driver can feel great backlash on the steering wheel and can sense any trouble of the steering system.

Further, as shown in FIG. 1, the projections 40 of the male shaft 1 are formed concentrically with the grooves 3 and 4 of the male shaft 1 extended in the axial direction and also concentrically with the balls 7 and the needle rollers 8, so as to play the role of stoppers for restricting the axial movement of the balls 7 and the needle rollers 8. Thus, the possibility of slip-off of the ball 7 or the needle roller 8 is reduced to further enhance the fail safe function.

Further, the projections 40 of the male shaft 1 are formed concentrically with the grooves 3 and 4 of the male shaft extended in the axial direction and concentrically also with the balls 7 or the needle rollers 8, so that the radial dimensions of the male shaft 1 and the female shaft 2 can be decreased so as to reduce the sizes thereof.

Also, the projections 40 of the male shaft 1 are formed concentrically with the balls 7 and the needle rollers 8 in the axial direction as described above, and moreover, the number of sets of the balls 7 or the needle rollers 8 in the circumferential direction is set to be equal to the number of projections 40 in the circumferential direction, so that the projections 40 can play the role of the stopper for restricting the axial movement of the balls 7 or the needle rollers 8 without fail. As a result, the possibility of slip-off of the balls 7 and the needle rollers 8 is further reduced to further enhance the fail safe function.

Further, an end of the female shaft 2 is provided with an inward deformation portion 41 which is deformed inward. Specifically, this inward deformation portion 41 is formed by caulking or plastically deforming the end of the female shaft 2.

With this arrangement, when the male shaft 1 is moved in a direction of slipping off the female shaft 2, the projection 40 of the male shaft 1 latches on to (interfered with) the inward deformation portion 41 (for example, the caulked or clinched portion) which is formed at the end of the female shaft 2. Thus, it is arranged such that the male shaft 1 is not easily separated from the female shaft 2.

Figure 7:
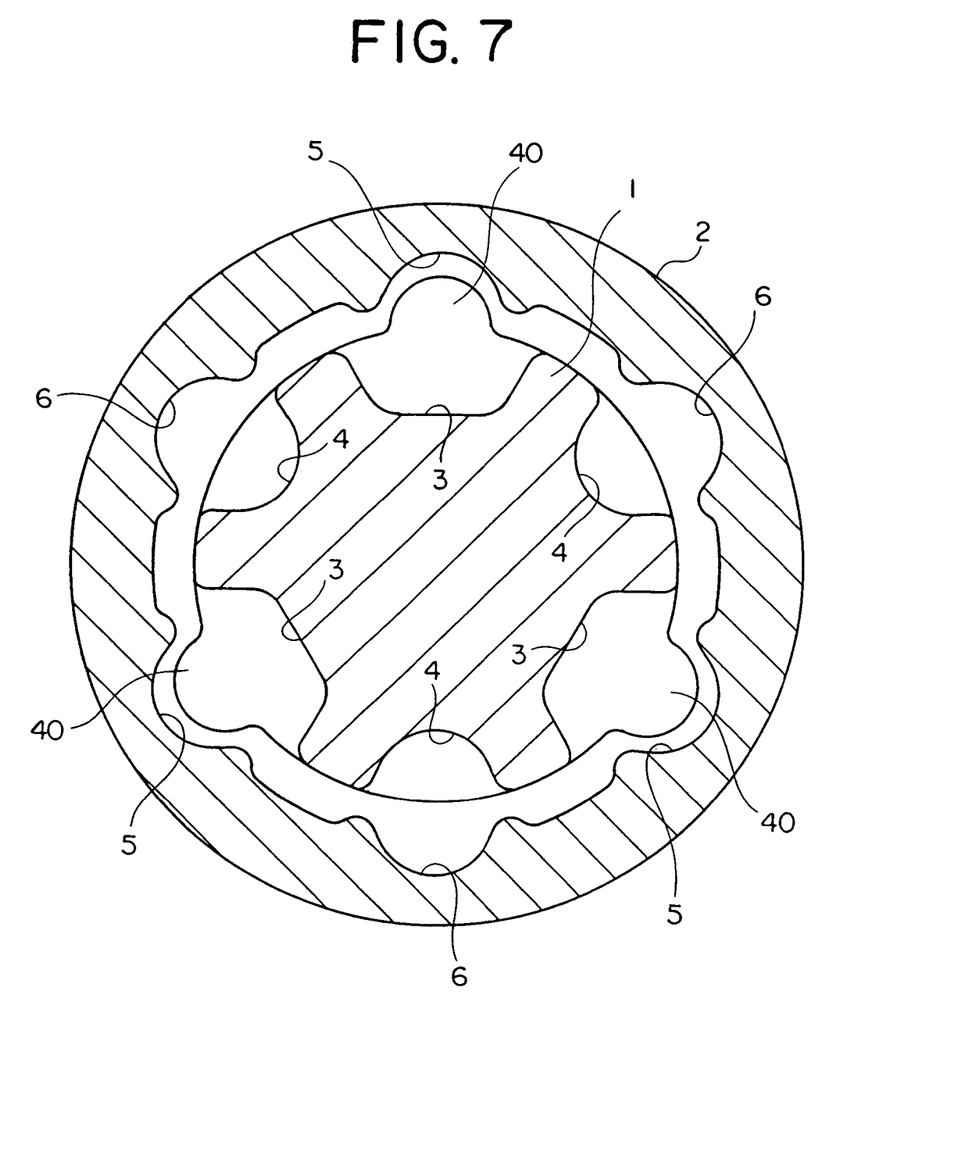
FIG. 7 is a cross sectional view, taken along the line Z-Z in FIG. 1, according to a first variation of the embodiment of the present invention.

Next, FIG. 7 is a cross sectional view, taken along the line Z-Z in FIG. 1, according to a first variation of the embodiment of the present invention.

In this variation, the three substantially arch-shaped projections 40 which are formed concentrically with the three grooves 3 formed on the outer peripheral surface of the male shaft 1 to be extended in the axial direction are opposite to the three grooves 5 of the female shaft 2 extended in the axial direction through a gap existing therebetween in the radial direction.

That is, the three projections 40 are provided only on the rear side of the vehicle of the three sets of the balls 7.

Accordingly, when the balls 7 slip off the male shaft 1 or are broken for any reason, the projections 40 of the male shaft 1 are fitted in the grooves 5 of the female shaft 2 extended in the axial direction, whereby the male shaft 1 and the female shaft 2 can transmit torque and can discharge the fail safe function.

In this case, as shown in FIG. 7, since there is formed the gap between the grooves 5 of the female shaft 2 extended in the axial direction and the projections 40 of the male shaft 1, the driver can feel great backlash on the steering wheel and can sense any trouble of the steering system.

Further, as shown in FIG. 1, the projections 40 of the male shaft 1 are formed axially concentrically with the grooves 3 of the male shaft 1 extended in the axial direction and also concentrically with the balls 7 in the axial direction, so as to play the role of the stoppers for restricting the axial movement of the balls 7. Thus, the possibility of slip-off of the balls 7 is reduced to further enhance the fail safe function.

Further, the projections 40 of the male shaft 1 are formed concentrically with the grooves 3 of the male shaft 1 extended in the axial direction and also concentrically with the balls 7 in the axial direction, so that the radial dimensions of the male shaft 1 and the female shaft 2 can be decreased so as to reduce the sizes thereof.

Also, the projections 40 of the male shaft 1 are formed concentrically with the balls 7 in the axial direction as described above, and moreover, the number of the sets of the balls 7 in the circumferential direction is set to be equal to the number of the projections 40 in the circumferential direction, so that the projections 40 can play the role of the stoppers for restricting the axial movement of the balls 7 without fail. As a result, the possibility of slip-off of the ball 7 is further reduced.

Figure 8:
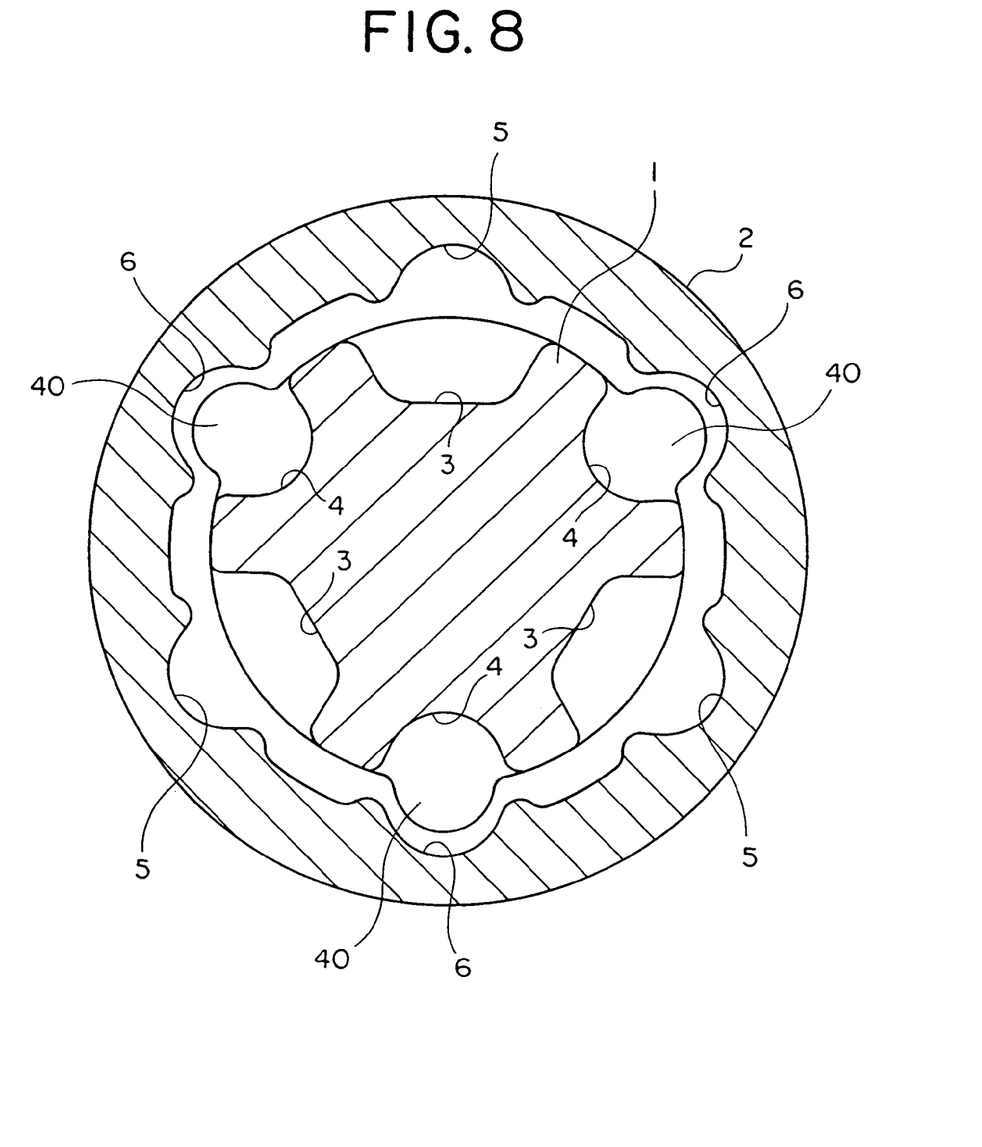
FIG. 8 is a cross sectional view, taken along the line Z-Z in FIG. 1, according to a second variation of the embodiment of the present invention.

Next, FIG. 8 is a cross sectional view, taken along the line Z-Z in FIG. 1, according to a second variation of the embodiment of the present invention.

In the second variation, the three substantially arch-shaped projections 40 which are formed concentrically with the three grooves 4 formed on the outer peripheral surface of the male shaft 1 to be extended in the axial direction are opposite to the three grooves 6 of the female shaft 2 extended in the axial direction through a radial gap existing therebetween.

That is, the three projections 40 are provided only on the rear side of the vehicle of the three sets of the needle rollers 8.

Accordingly, when the needle rollers 8 slip off the male shaft 1 or are broken for any reason, the projections 40 of the male shaft 1 are fitted in the grooves 6 of the female shaft 2 extended in the axial direction, whereby the male shaft 1 and the female shaft 2 can transmit torque and can discharge the fail safe function.

Also, in this case, as shown in FIG. 8, since there is formed the gap between the grooves 6 extended in the axial direction and the projections 40, the driver can feel great backlash on the steering wheel and can sense any trouble of the steering system.

Further, as shown in FIG. 1, the projections 40 of the male shaft 1 are formed concentrically in the axial direction with the grooves 4 of the male shaft extended in the axial direction and also concentrically with the needle rollers 8 in the axial direction, so as to play the role of the stoppers for restricting the axial movement of the needle rollers 8. Thus, the possibility of slip-off of the needle rollers 8 is reduced to further enhance the fail safe function.

Further, the projections 40 of the male shaft 1 are formed concentrically in the axial direction with the grooves 4 of the male shaft 1 extended in the axial direction and also concentrically with the needle rollers 8 in the axial direction, so that the radial dimensions of the male shaft 1 and the female shaft 2 can be decreased so as to reduce the sizes thereof.

Also, the projections 40 of the male shaft 1 are formed concentrically with the needle rollers 8 in the axial direction, as described above, and moreover, the number of sets of the needle rollers 8 in the circumferential direction is set to be equal to the number of projections 40 in the circumferential direction, so that the projections 40 can play the role of the stoppers for restricting the axial movement of the needle rollers 8 without fail. As a result, the possibility of slip-off of the ball 7 is further reduced.

Note that the present invention is not limited to the embodiments described above, but can be altered in various manners.

As described above, according to the present invention, the projections which are formed concentrically in the axial direction with the axial grooves formed on the outer peripheral surface of the male shaft are fitted in the axial grooves of the female shaft through the gap in the radial direction exiting therebetween.

As a result, when the torque transmitting members slip off the male shaft or are broken for any reason, the projections of the male shaft are fitted in the axial grooves of the female shaft, whereby the male shaft and the female shaft can transmit torque and can discharge the fail safe function.

Also, since there is formed the gap between the axial grooves and the projections in this case, the driver can feel great backlash on the steering wheel and can sense any trouble of the steering system.

Further, the projections of the male shaft are formed concentrically in the axial direction with the axial grooves of the male shaft and also concentrically with the torque transmitting members in the axial direction, so as to play the role of the stoppers for restricting the axial movement of the torque transmitting members. Thus, the possibility of slip-off of the torque transmitting members is reduced to further enhance the fail safe function.

Further, the projections of the male shaft are formed concentrically in the axial direction with the axial grooves of the male shaft and also concentrically with the torque transmitting members in the axial direction, so that the radial dimensions of the male shaft and the female shaft can be decreased so as to reduce the sizes thereof.

What is claimed is:

1. A telescopic shaft for vehicle steering which is installed in a steering shaft of a vehicle and in which a male shaft and a female shaft are fitted to each other to be capable of transmitting torque therebetween and moving in an axial direction, characterized in that:

at least one first pair of axially extending grooves is formed respectively on an outer peripheral surface of said male shaft and an inner peripheral surface of said female shaft so as to face each other with at least one spherical body, radially biased by a spring, interposed therebetween; and for at least one said first pair of grooves, a corresponding projection is formed on the outer peripheral surface of said male shaft so as to be axially juxtaposed to the corresponding groove formed on the outer peripheral surface of said male shaft and so as to be fitted, through a gap, in the corresponding groove formed on the inner peripheral surface of said female shaft.

2. A telescopic shaft for vehicle steering according to claim 1, wherein at least one second pair of axially extending grooves is formed respectively on the outer peripheral surface of said male shaft and an inner peripheral surface of said female shaft so as to face each other with at least one columnar body being interposed therebetween, said second pair of grooves being adjacent in a circumferential direction to at least one said first pair of grooves.

3. A telescopic shaft for vehicle steering according to claim 1, wherein one said projection is provided for each said first pair of grooves.

4. A telescopic shaft for vehicle steering according to claim 1, wherein said female shaft comprises at an end thereof a deformation portion which is deformed inwardly.

5. A telescopic shaft for vehicle steering which is installed in a steering shaft of a vehicle and in which a male shaft and a female shaft are fitted to each other to be capable of transmitting torque therebetween and moving in an axial direction, characterized in that:

at least one first pair of axially extending grooves is formed respectively on an outer peripheral surface of said male shaft and an inner peripheral surface of said female shaft so as to face each other with at least one torque transmitting member interposed therebetween, said one torque transmitting member, for at least one said first pair of grooves, being a spherical body biased radially by a spring; and for at least one said first pair of grooves, a corresponding projection is formed on the outer peripheral surface of said male shaft so as to be axially juxtaposed to the corresponding groove formed on the outer peripheral surface of said male shaft and so as to be fitted, through a gap, in the corresponding groove formed on the inner peripheral surface of said female shaft.

6. A telescopic shaft for vehicle steering according to claim 5, wherein one said projection is provided for each said first pair of grooves.

7. A telescopic shaft for vehicle steering according to claim 5, wherein said female shaft comprises at an end thereof a deformation portion which is deformed inwardly.

* * * * *